(12) United States Patent
DiBartolomeo et al.

(10) Patent No.: US 7,577,872 B2
(45) Date of Patent: Aug. 18, 2009

(54) DYNAMIC SYSTEM DIAGNOSIS

(75) Inventors: Jeffrey A. DiBartolomeo, Merrick, NY (US); Bradley Wellington, New York, NY (US)

(73) Assignee: Home Box Office, New York, NY (US)

( * ) Notice: Subject to any disclaimer, the term of this patent is extended or adjusted under 35 U.S.C. 154(b) by 425 days.

(21) Appl. No.: 11/467,278

(22) Filed: Aug. 25, 2006

(65) Prior Publication Data

US 2007/0050673 A1    Mar. 1, 2007

Related U.S. Application Data

(60) Provisional application No. 60/712,026, filed on Aug. 26, 2005.

(51) Int. Cl.
*G06F 11/00* (2006.01)

(52) U.S. Cl. ............... 714/27; 714/25; 714/37; 714/38

(58) Field of Classification Search ........... 714/25, 714/27, 37, 38, 46, 48, 57
See application file for complete search history.

(56) References Cited

U.S. PATENT DOCUMENTS

| 5,991,897 | A  | * | 11/1999 | Perugini et al. | ............... | 714/27 |
| 6,175,934 | B1 | * | 1/2001 | Hershey et al. | ............... | 714/25 |
| 6,178,452 | B1 | * | 1/2001 | Miyamoto | ............... | 714/25 |
| 6,282,709 | B1 |   | 8/2001 | Reha et al. | | |
| 6,480,972 | B1 | * | 11/2002 | Cromer et al. | ............... | 714/25 |
| 6,687,901 | B1 |   | 2/2004 | Imamatsu | | |
| 6,760,908 | B2 |   | 7/2004 | Ren | | |
| 7,020,598 | B1 |   | 3/2006 | Jacobson | | |
| 7,200,775 | B1 | * | 4/2007 | Rhea et al. | ............... | 714/27 |
| 2004/0205406 | A1 | * | 10/2004 | Kaliappan et al. | ............. | 714/31 |
| 2005/0034029 | A1 | * | 2/2005 | Ramberg et al. | ............. | 714/43 |
| 2006/0122746 | A1 |   | 6/2006 | Gawlik et al. | | |
| 2007/0022407 | A1 | * | 1/2007 | Givoni et al. | ............... | 717/124 |

\* cited by examiner

*Primary Examiner*—Robert Beausoliel
*Assistant Examiner*—Joseph D Manoskey
(74) *Attorney, Agent, or Firm*—Mendelsohn, Drucker, & Associates, P.C.; Edward J. Meisarosh; Steve Mendelsohn

(57) ABSTRACT

In one embodiment, the invention is a computer-implemented method that (i) launches a diagnostic tool designed for use with a primary software application, (ii) determines whether a diagnostic definitions file (DDF) needs to be updated, (iii) updates the DDF, if needed, (iv) performs one or more of the diagnostic tests specified in the DDF, (v) determines whether the result produced by each performed diagnostic test is equivalent to the expected result for the performed diagnostic test, and (vi) performs the failure action specified for each performed diagnostic test whose result is not equivalent to the expected result for the performed diagnostic test. The DDF has information specifying: (i) the one or more diagnostic tests, (ii) an expected result for each diagnostic test, and (iii) a failure action to be performed for each diagnostic test, if the result produced by the diagnostic test is not equivalent to the expected result.

20 Claims, 4 Drawing Sheets

*FIG. 2*

| LINE NUMBER | XML FILE |
|---|---|
| 1 | <?xml version="1.0" encoding="utf-8" ?> |
| 2 | <requirements> |
| 3 | <system-requirements> |
| 4 |    <system-memory>512</system-memory> |
| 5 |    <disk-space>500</disk-space> |
| 6 |    <windows-version>4.10.2222</windows-version> |
| 7 |    <on-fail> |
| 8 |       <launch-url>http://www.hbo.com</launch-url> |
| 9 |       <remedy><![CDATA[The minimum system requirements are a Pentium III/266MHz, 512MB |
| 10 |         System RAM, Windows 98SE or higher, and a broadband Internet connection]]></remedy> |
| 11 |    </on-fail> |
| 12 | </system-requirements> |
| 13 | <required-components> |
| 14 |    <component> |
| 15 |       <name>Internet Explorer</name> |
| 16 |          <checks> |
| 17 |             <registry-version-check> |
| 18 |                <root>HKLM</root> |
| 19 |                <subkey>Software\Microsoft\Internet Explorer</subkey> |
| 20 |                <entry>Version</entry> |
| 21 |                <required>5.0.1</required> |
| 22 |             </registry-version-check> |
| 23 |          </checks> |
| 24 |       <on-fail> |
| 25 |          <download-and-install> |
| 26 |             <default>http://www.microsoft.com/ie6setup.exe</default> |
| 27 |          </download-and-install> |
| 28 |          <remedy><![CDATA[Internet Explorer 5 or above must be installed.]]></remedy> |
| 29 |       </on-fail> |
| 30 |    </component> |
| 31 | </required-components> |
| 32 | </requirements> |

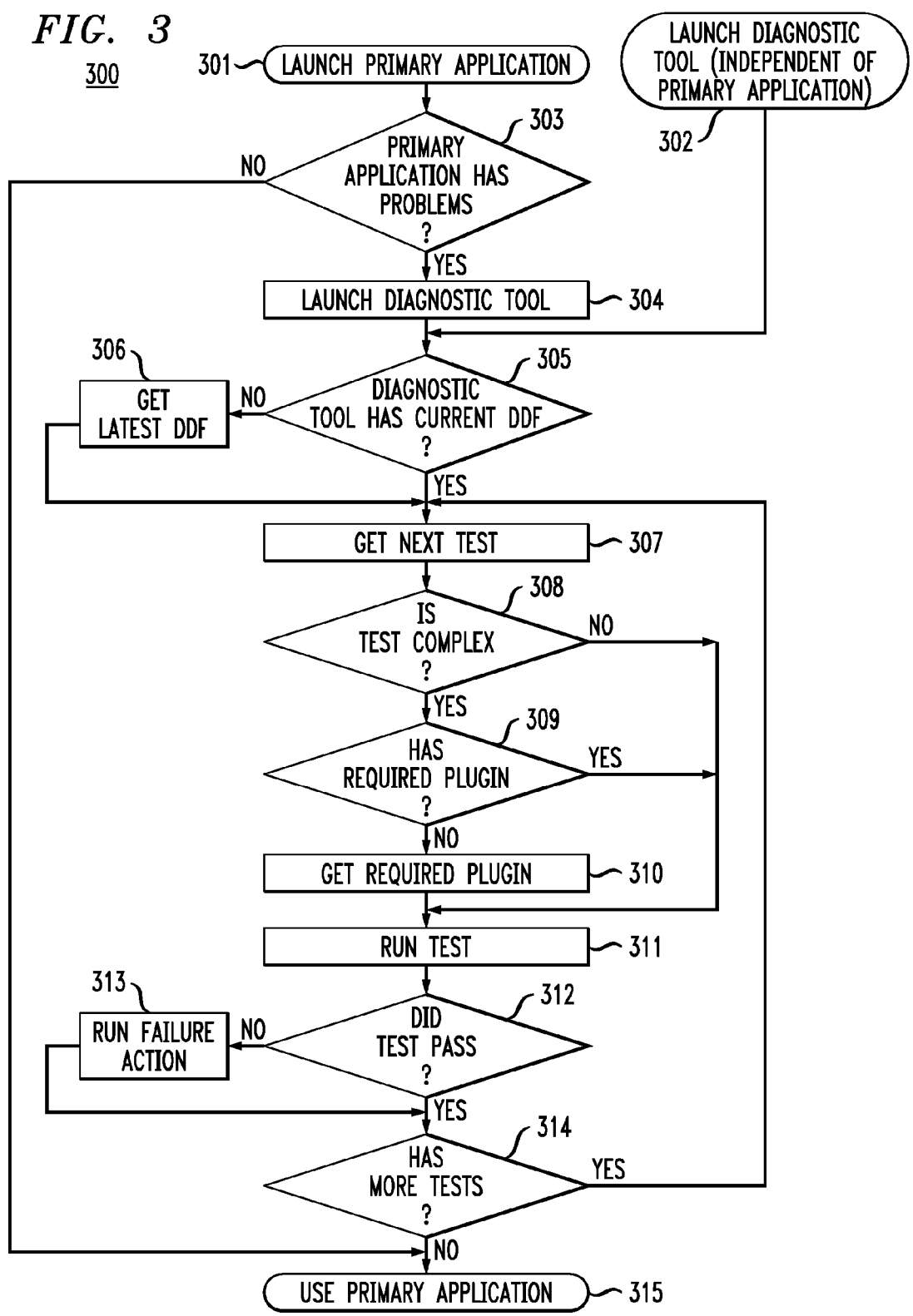

DYNAMIC SYSTEM DIAGNOSIS

This application claims the benefit of the filing date of U.S. provisional application No. 60/712,026, filed on Aug. 26, 2005, the teachings of which are incorporated herein by reference.

BACKGROUND OF THE INVENTION

1. Field of the Invention

This invention relates generally to software applications, and more particularly to the diagnosis and/or repair of hardware, software, or other problems that may prevent the proper operation of a software application.

2. Description of the Related Art

Software applications are typically developed and tested in controlled environments. However, software applications operate in the field in environments often different from the environments in which the software applications were developed. While a software application may be developed on a particular hardware platform, running a particular operating system with particular parameter settings, and with a particular group of other software applications on that platform, the software application will likely be used in a non-identical setting in the field. Even if an application is initially installed in an operational environment identical to its development environment, changes, such as updates, are likely to be made to the operating system and/or other software applications of the operational environment. Similarly, there may be changes to the hardware platform on which the software application is installed. Hardware changes may include replacement or failure of a component. One or more of the above changes may prevent the software application from operating as intended in the operational environment.

Similarly, if the software application is installed in an operational environment different from the application's development environment, then the software application might not operate as intended. The improper operation could be the result of missing hardware, missing software, incompatible hardware, or incompatible software. Even if the software application is installed in an environment identical to the development environment and no changes are made to the operating environment, it may be discovered at a later stage of development that an incompatibility exists between the software application and the environment, which prevents the proper operation of the software application.

SUMMARY OF THE INVENTION

One embodiment of the present invention is a computer-implemented method comprising: (a) launching a diagnostic tool designed for use with a primary software application (PSA), (b) determining, by the diagnostic tool, whether a diagnostic definitions file (DDF) for use by the diagnostic tool needs to be updated, (c) updating the DDF, if the DDF needs to be updated, (d) performing, by the diagnostic tool, one or more of the diagnostic tests specified in the DDF, (e) determining, by the diagnostic tool, whether the result produced by each performed diagnostic test is equivalent to the expected result for the performed diagnostic test, and (f) performing the failure action specified for each performed diagnostic test whose result is not equivalent to the expected result for the performed diagnostic test. The DDF comprises: (i) information specifying one or more diagnostic tests related to the PSA to be performed by the diagnostic tool, wherein each diagnostic test produces a result, (ii) information specifying an expected result for each diagnostic test, and (iii) specification of a failure action to be performed for each diagnostic test, if the result produced by the diagnostic test is not equivalent to the expected result for the diagnostic test.

Another embodiment of the present invention is a computer system comprising a processor and a memory, wherein: (a) the memory is adapted to store a diagnostic definitions file (DDF) adapted to be used by a diagnostic tool designed for use with a primary software application (PSA), and (b) the processor is adapted to launch the diagnostic tool, wherein the diagnostic tool is adapted to: (i) determine whether the DDF needs to be updated, (ii) update the DDF, if the DDF needs to be updated, (iii) perform one or more of the diagnostic tests specified in the DDF, (iv) determine whether the result produced by each performed diagnostic test is equivalent to the expected result for the performed diagnostic test, and (v) perform the failure action specified for each performed diagnostic test whose result is not equivalent to the expected result for the performed diagnostic test. The DDF comprises: (i) information specifying one or more diagnostic tests related to the PSA to be performed by the diagnostic tool, wherein each diagnostic test produces a result, (ii) information specifying an expected result for each diagnostic test, and (iii) specification of a failure action to be performed for each diagnostic test if the result produced by the diagnostic test is not equivalent to the expected result for the diagnostic test.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 2 shows a sample DDF file in XML format, in accordance with one embodiment of the present invention.

FIG. 3 shows a sample flowchart for the operation of a diagnostic tool in accordance with one embodiment of the present invention.

DETAILED DESCRIPTION

Figure 1:
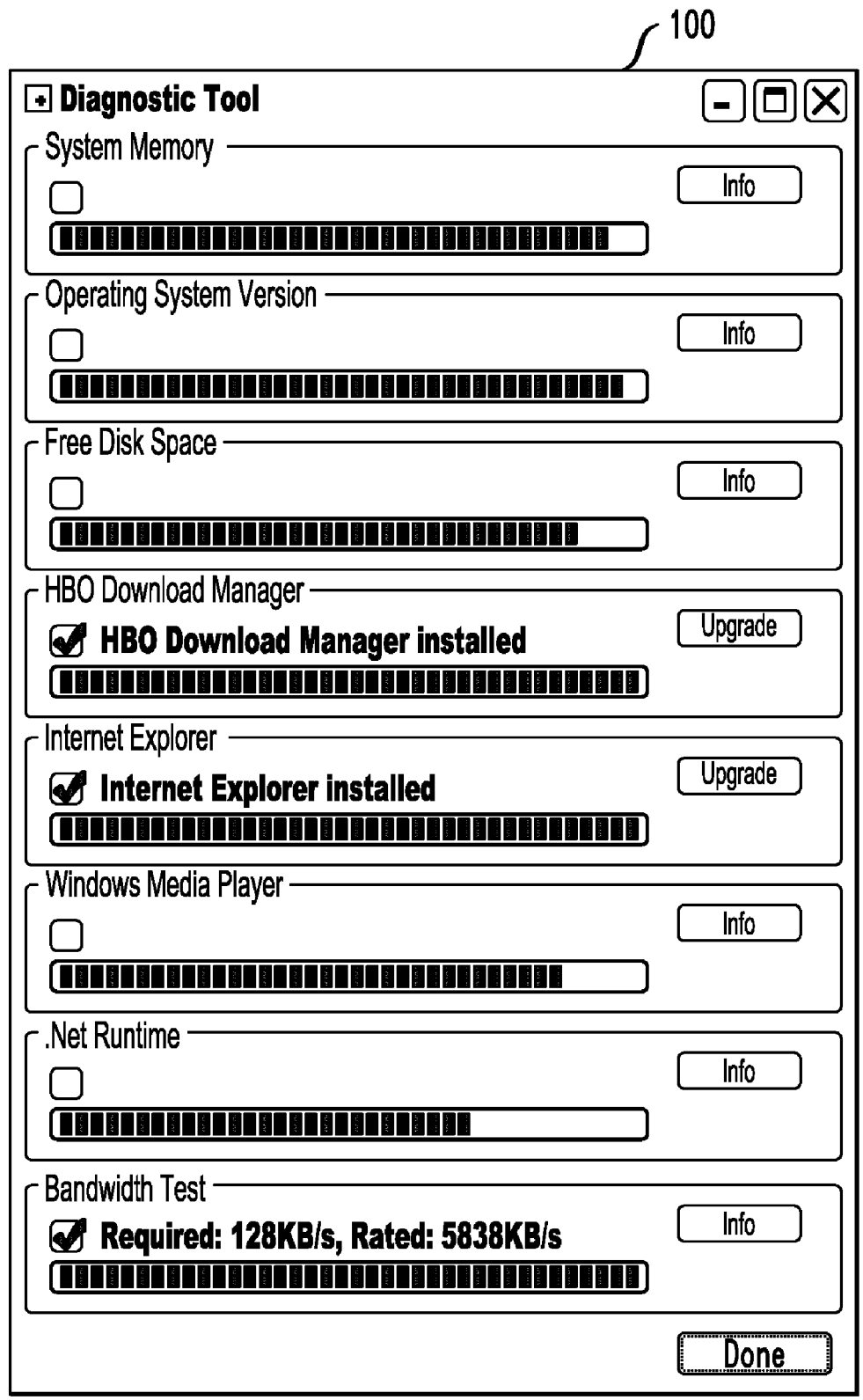
FIG. 1 shows a sample window in accordance with one embodiment of the present invention displaying the progress of several diagnostic tests as they are being performed.

One embodiment of the present invention provides a comprehensive and dynamic system for diagnosing and fixing problems that might prevent a software application, hereinafter referred to as the "primary software application," from operating properly on a particular computer or computerized device. The dynamic diagnostic system comprises a diagnostic tool and a diagnostic definitions file (DDF). The diagnostic tool is a software application that is bundled with the primary software application, and thus resides on the end user's computer or device.

The diagnostic tool is adapted to perform various diagnostic tests to determine if the host computer or device and its operating environment are compatible with the primary software application. Rather than having any specific tests encoded in its instruction set, the diagnostic tool executes instructions from the external DDF. Thus, the diagnostic tool does not itself need to be updated in order to perform new or different functions, and thus should not itself require updates. This allows the provider of the primary software application to more-easily add additional, or previously unknown, dependencies or tests for the primary software application after its release and distribution.

A primary function of the diagnostic tool is reading a DDF and executing the tests and actions the DDF calls for. Thus, the actual result of running the diagnostic tool application is greatly dependent on the particular DDF it uses. A secondary function of the diagnostic tool is updating as appropriate the DDF it is using. Additional functions of the diagnostic tool include displaying the results of the tests it runs, and correcting, or attempting to correct, problems that are discovered by those tests.

When activated, the diagnostic tool executes one or more of the tests specified in the DDF. Some of these tests may involve low-level conditions that the diagnostic tool may be able to check natively. In other words, the diagnostic tool may be designed with the ability to perform certain low-level tests. If a particular test is particularly complex, then the DDF can direct the diagnostic tool to download or execute a plug-in or application from a specified uniform resource locator (URL) address, which can identify a wide range of locations. For example, a plug-in may be located on, and downloaded or executed from, a local memory drive, at a hyper-text transfer protocol (HTTP) address, on a file transfer protocol (FTP) server, or any other location identifiable with a URL. The plug-in will contain specific code to perform the complex test. This feature allows the diagnostic tool virtually unlimited functionality, without ever requiring updating the diagnostic tool application itself.

The diagnostic tool is able to check, at programmable times, for updates of the DDF it uses. The diagnostic tool can check for an updated DDF upon startup, at predetermined intervals, or upon the occurrence of specified events. If the diagnostic tool determines that an update of the DDF is necessary, then the diagnostic tool updates the DDF. The diagnostic tool can replace the old DDF with the new DDF, or it can update only the section(s) that need updating. The diagnostic tool preferably checks for DDF updates and downloads DDF updates via a network, wired or wireless. However, in an alternative implementation, the diagnostic tool can check for and implement updates via local means, such as by connecting to the system a memory device, e.g., diskette or portable flash drive, containing a DDF update.

Some examples of downloading a DDF update via a network are: (i) downloading a DDF update to a personal computer using the Internet, (ii) downloading a DDF update to a cellular telephone using wireless application protocol (WAP), (iii) downloading a DDF update to a handheld device over a Bluetooth network or similar wireless personal area network (PAN), and (iv) downloading a DDF update to an automobile computer via a satellite link. Numerous additional arrangements for downloading an updated DDF are possible, as would be appreciated by one of ordinary skill in the art.

The diagnostic tool is adapted to display to the user the results of the tests performed. The diagnostic tool is adapted to have a user interface which will inform the user of how many tests were run and which tests have passed and which ones have failed, as well as an indication of the corrective action to be taken in response to the failures.

FIG. 1 shows sample window 100 displaying the progress of several sample diagnostic tests as they are being performed. Window 100 shows that the diagnostic tests for HBO Download Manager, Internet Explorer, and Bandwidth have (i) been completed, as indicated by the respective full percentage completion bars, and (ii) passed, as indicated by the check marks in the respective check boxes, as well as the informative text, e.g., "installed," in the respective boxes. Window 100 shows several other tests, specifically, System Memory, Operating System Version, Free Disk Space, Windows Media Player, and .Net Runtime, as still in progress, as indicated by the respective partially full percentage completion bars for those tests. In an alternative implementation, if the number of tests performed is considered too large to display effectively, then only failed tests are shown in detail to the user, while other tests are either not shown, or shown only in summary, e.g., by noting the number of tests performed and the number passed. As would be appreciated by one of ordinary skill in the art, numerous user interfaces may be implemented for the diagnostic tool.

The diagnostic tool is adapted to perform corrective action in response to failures of diagnostic tests. The corrective action for each test is specified in the DDF. Corrective action can be an automatic repair of the problem, a suggestion to the user of a solution, or simply the alerting of the user to the existence of the problem. An automatic repair preferably includes prompting the user for approval. An example of a problem suitable for an automatic repair is the absence of the particular version of an application that the primary software application requires, where the particular version can be downloaded via an available network. In such a case, the diagnostic tool can, with the user's approval, download and install the needed version of the application.

Some problems detected by failed diagnostic tests, however, are not correctable by software-only fixes. For such failures, the diagnostic tool informs the user of the problem and suggests a corrective action, if available. For example, a system-memory-size diagnostic test would fail if the operating environment for the primary software application does not have sufficient physical memory for the requirements of the primary software application. In such a situation, the diagnostic tool can inform the user of the insufficient physical memory and suggest adding physical memory.

The DDF contains the collection of tests to be performed. For each test, the DDF contains the expected result, and actions to take in case of test failure. The DDF contains three types of information: test definitions, plug-in definitions, and failure actions. Each of these information types is described below.

The DDF may be an extensible markup language (XML) file. The DDF may also be a tabular database, a serialized object, e.g., an encoded text file, or in any other appropriate format that can exist independently of the diagnostic tool. An advantage of XML is that it is an open, flexible standard that allows the simple description, storage, and transmission of data across varying platforms—features that make it particularly useful for Internet-based applications.

FIG. 2 shows, for illustrative purpose, a sample DDF file in XML format. The line numbers on the left side are for reference and are not part of the XML file. FIG. 2, at lines 3-6, shows that the minimum system requirements include a system memory of 512 units, disk space of 500 units, and Windows version 4.10.2222. If the system requirements test fails, then the diagnostic tool is directed to launch a web browser, set its address to "http://www.hbo.com," and provide a notification of the minimum system requirements. See FIG. 2, lines 7-11. FIG. 2, at lines 13-15, further shows that one component required to be in the operating environment by the primary software application is Internet Explorer. The Windows registry is checked to determine whether the correct version of Internet Explorer is available. See FIG. 2, lines 16-23. If the test fails, then the diagnostic tool is directed to download and install Internet Explorer from www.microsoft.com, and provide a notification that Internet Explorer 5 or above must be installed. See FIG. 2, lines 24-29.

At its root level, an XML DDF is made up of a set of test definitions. Each test definition consists of a set of conditions that need to be satisfied in order for the test to be passed. In one embodiment of the present invention, there are two types of conditions that can make up a test: low-level conditions and complex conditions. Low-level conditions are conditions that are generic on a platform, i.e., they are likely to be appropriate for a wide variety of applications. The set of low-level conditions will vary depending on the platform on which the diagnostic tool is running and on the particular DDF used. Some examples of tests of low-level conditions include: (i) checking for the existence of a particular file on a computer's drive, (ii) checking for the existence of a particular registry key on a computer running Windows, (iii) checking the amount of available memory, RAM and/or storage, on a computer, (iv) verifying the presence of an outgoing connection, or dial tone, on a telephone line, (v) verifying the presence of a wireless network for a handheld device, and (vi) checking a sensor in a device for a specific value.

Complex conditions are ones that are more application-specific. Some examples of complex conditions include: (i) ensuring that Windows Media Player can successfully play a movie, (ii) ensuring that network download speed meets a certain minimum, and (iii) increasing the rate of fuel injection in an automobile to see if the engine's oxygen sensor responds as expected. In one embodiment of the present invention, the specific behavior of a complex condition may be defined in a plug-in, since the logic needed to verify complex conditions may not necessarily reside within the diagnostic tool, but rather be defined externally.

If a particular test requires an external plug-in, then the DDF will contain sufficient information about the plug-in to allow it to run. This information includes the location, whether local or remote, of the plug-in, and may include meta-data about the plug-in's name and size. If the plug-in is located remotely on a network, it may be downloaded to the operating environment. For downloaded plug-ins, the information in the DDF can include a checksum, so that when the plug-in is downloaded over the network, the diagnostic tool can verify that it has correctly retrieved the desired plug-in. The plug-in architecture allows the DDF author to expand the capabilities for the diagnostic tool beyond the set of low-level actions that have been predefined for the particular diagnostic tool.

Each test defined in the DDF has a corresponding failure action. The failure action for a test defines what the diagnostic tool should do in the event that the test fails. The response of the diagnostic tool to a failed test can vary greatly depending on the platform on which the diagnostic tool is running, as well as the type of test that failed. Some examples of failure actions include: (i) displaying a message to a cell phone user informing the user that an application cannot run because the phone is not currently in-network, (ii) sending a message to a cable provider that a cable box has been tampered with, (iii) retrieving an installer for missing software from over the Internet and executing it on a personal computer, and (iv) lighting an automobile's "check engine" indicator and alerting the manufacturer about the problem via the automobile's satellite link.

By packaging the diagnostic tool with the primary software application and providing a mechanism whereby the diagnostic tool can periodically download an updated DDF, the vendor of the primary software application can change the system requirements of the primary software application as needed or desired. In addition, the vendor can create different DDFs for deployment of the primary software application on different platforms or in different operating environments.

FIG. 3 shows sample flowchart 300 for the operation of a diagnostic tool in accordance with one embodiment of the present invention. Flowchart 300 has two possible starting points. In step 301, the primary software application is launched. In step 303, it is determined whether the primary software application is experiencing problems in launching. If no problems are detected (step 303), then the primary application proceeds to run (step 315). If problems are found (step 303), then the diagnostic tool is launched (step 304). The diagnostic tool can also be launched (step 302) independently of the primary software application, e.g., at predetermined intervals. After the diagnostic tool has been launched (step 302 or 304), the diagnostic tool checks to see if it has the current DDF, i.e., whether there is an updated DDF (step 305). If an updated DDF is available, then the diagnostic tool retrieves it (step 306). After the diagnostic tool either confirms it has the latest DDF (step 305) or gets the latest DDF (step 306), the diagnostic tool gets the next test (step 307).

Next, the diagnostic tool determines whether the next test is complex (step 308). If the next test is determined to not be complex (step 308), then the diagnostic tool runs the test (step 311). If the next test is determined to be complex (step 308), then the diagnostic tool determines whether it has the required plug-in (step 309). If the diagnostic tool determines that it has the required plug-in (step 309), then the diagnostic tool runs the test (step 311). If the diagnostic tool determines that it does not have the required plug-in (step 309), then the diagnostic tool retrieves the required plug-in (step 310) and runs the test (step 311).

After the diagnostic tool runs the test (step 311), the diagnostic tool determines whether the test resulted in a pass (step 312). If the test passed, then the diagnostic tool determines whether the DDF has more tests to run (step 314). If there are more tests to run (step 314), then the diagnostic tool returns to step 307 to get the next test. If there are no more tests to run (step 314), then the primary software application proceeds to run (step 315). If the diagnostic tool determines that the test resulted in a failure (step 312), then the diagnostic tool runs the failure action specified for the test in the DDF (step 313). The failure action (step 313) might include a corrective action that resolves the problem, in which case the diagnostic tool goes to step 314 to determine whether the DDF has more tests to run. However, the failure action (step 313) might require a corrective action that cannot be performed immediately, e.g., the installation of additional physical memory, which would require termination of the procedure (not shown), or the corrective action might otherwise require termination of the procedure (not shown) without checking for additional tests (step 314) or running the primary software application (step 315).

In one embodiment of the present invention, the primary software application can be any computer software application that has specific measurable hardware and/or software requirements for its operating environment. The primary software application is provided with a diagnostic tool that is installed together with the primary software application. Each time the diagnostic tool is launched, it checks for an updated DDF and, if found, retrieves the updated DDF. The diagnostic tool can be set to automatically launch whenever the primary software application is launched. The diagnostic tool then runs tests and takes actions as described above.

Figure 4:
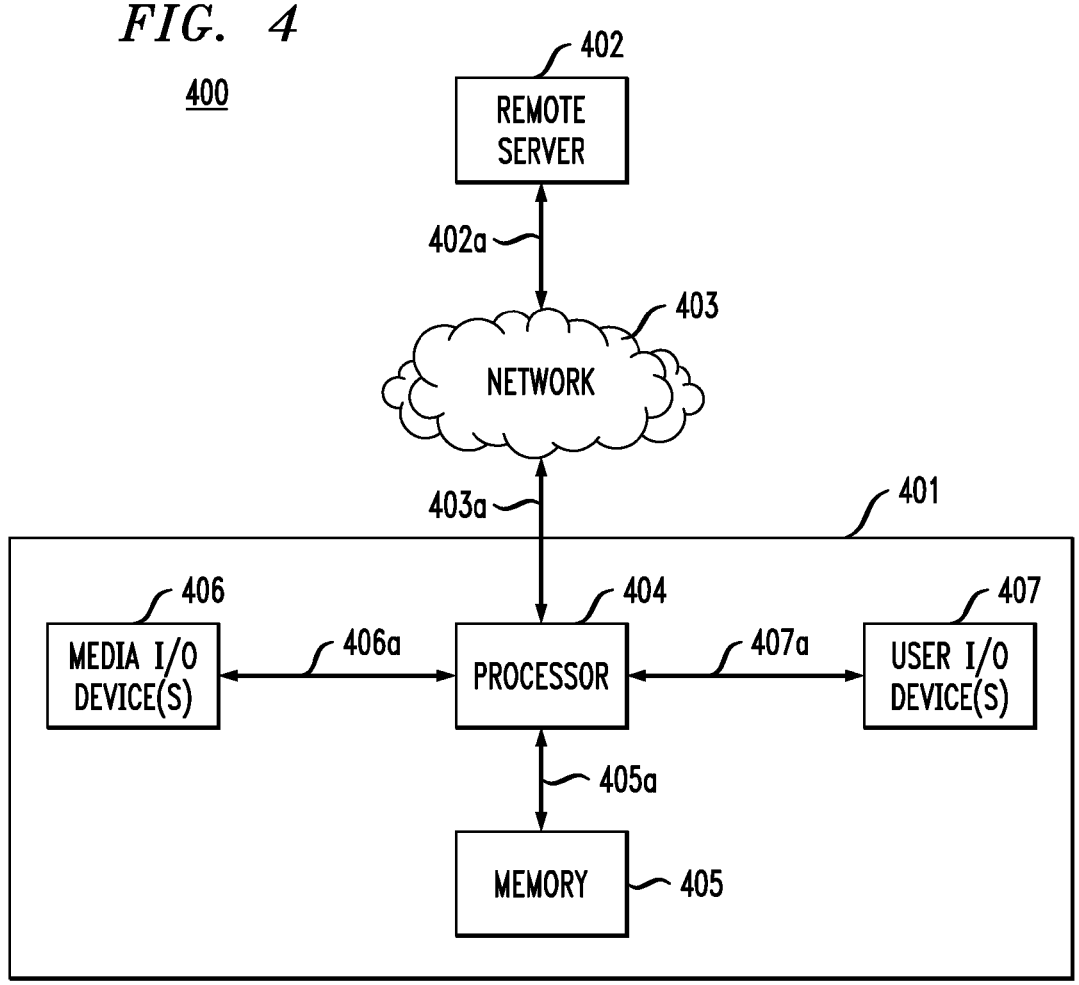
FIG. 4 shows a computer system in accordance with one embodiment of the present invention.

FIG. 4 shows computer system 400, in accordance with one embodiment of the present invention. Computer system 400 comprises computer 401, which is connected to remote server 402 via network 403. Computer 401 can be a standalone personal computer or part of a consumer product, such as a mobile phone or an automobile. Computer 401 comprises processor 404, optional media I/O device(s) 406, user I/O device(s) 407, and memory 405. Processor 404 is connected to: (i) network 403, via path 403a, (ii) media I/O device(s)

406, via path 406a, (iii) user I/O device(s) 407, via path 407a, and (iv) memory 405, via path 405a. Processor 404 is adapted to run the primary software application and the diagnostic tool. Memory 405 is adapted to store the DDF for use by the diagnostic tool. Media I/O device(s) 406 allow for the reading and/or writing of information from/to media such as diskettes, CDs, DVDs, flash drives, or any other suitable opto-magnetic storage media. Processor 404 is adapted to receive an updated DDF from media I/O device(s) 406 via path 406a. User I/O device(s) 407 comprise a monitor, a keyboard, a mouse, and/or any other suitable human I/O device to allow feedback to, and input from, a user. Remote server 402 is adapted to have and provide an updated DDF to computer 401 via network 403 and paths 402a and 403a. Network 403 can include wired systems, such as LANs or the PSTN, wireless systems, and combinations of wired and wireless systems, such as the Internet.

In another embodiment of the present invention, the primary software application is adapted to run on a mobile phone. The primary software application and the diagnostic tool are installed on the mobile phone by the vendor. The diagnostic tool runs tests and takes actions as described above.

In yet another embodiment of the present invention, the primary software application is adapted to run on an automobile computer. Many modern automobiles contain sophisticated computer systems that control most of the automobile's electronic functions and monitor mechanical systems such as the brake system, airbags, and numerous other sensors. Currently, if an automobile manufacturer discovers a possible defect, e.g., a faulty airbag or faulty sensor, then the manufacturer typically issues a wide-ranging recall, despite the possibly small percentage of automobiles that are actually affected by the defect. In this embodiment, the diagnostic tool is installed by the manufacturer at the factory, and the diagnostic tool can be set to launch every time the automobile engine is started. When the diagnostic tool is launched, it can check for an updated DDF via a satellite link installed in the automobile. If, for example, the manufacturer discovers a new potential defect, then the manufacturer can update the DDF to test for that defect. If an updated DDF is found, then the diagnostic tool can download the updated DDF. After checking for and/or downloading an updated DDF, the diagnostic tool runs the tests specified in the updated DDF. If a test fails, then the diagnostic tool can have the "check engine" lighted, and optionally also alert the manufacturer about the failed test via the satellite link.

The term "perform" and its variants, as used herein in reference to software applications, can refer to the execution of instructions by the performing application, as well as the calling of another application by the performing application to execute instructions. Thus, the performing application is not required to maintain control over every instruction in order to perform a task.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

References in descriptions of alternative embodiments to particular figures or previously-described embodiments do not limit the alternatives to those particular shown or previously-described embodiments. Alternative embodiments described can generally be combined with any one or more of the other alternative embodiments shown or described.

Unless explicitly stated otherwise, each numerical value and range should be interpreted as being approximate as if the word "about" or "approximately" preceded the value of the value or range.

The invention is not limited to the particular arrangement of components described and shown herein. It will be understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures. Furthermore, the use of particular terms and phrases herein is for the purpose of facilitating the description of the embodiments presented and should not be regarded as limiting.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A computer-implemented method comprising:
 (a) launching a diagnostic tool designed for use with a primary software application (PSA);
 (b) determining, by the diagnostic tool, whether a diagnostic definitions file (DDF) for use by the diagnostic tool needs to be updated, wherein the DDF comprises:
   information specifying one or more diagnostic tests related to the PSA to be performed by the diagnostic tool, wherein each diagnostic test produces a result;
   information specifying an expected result for each diagnostic test; and
   specification of a failure action to be performed for each diagnostic test, if the result produced by the diagnostic test is not equivalent to the expected result for the diagnostic test;
 (c) updating the DDF, if the DDF needs to be updated;
 (d) performing, by the diagnostic tool, one or more of the diagnostic tests specified in the DDF;
 (e) determining, by the diagnostic tool, whether the result produced by each performed diagnostic test is equivalent to the expected result for the performed diagnostic test; and
 (f) performing the failure action specified for each performed diagnostic test whose result is not equivalent to the expected result for the performed diagnostic test.

2. The method of claim 1, further comprising displaying for a user the result of each performed diagnostic test.

3. The method of claim 1, wherein, if the DDF needs to be updated, then the method includes updating the DDF without updating the diagnostic tool.

4. The method of claim 1, wherein the diagnostic tool is designed to operate with any updated DDF without having to update the diagnostic tool itself.

5. The method of claim 1, wherein at least one diagnostic test is designed to test the compatibility of the PSA with an operating environment for the PSA.

6. The method of claim 1, wherein:
the DDF specifies the location of a plug-in for at least one diagnostic test; and
step (d) comprises accessing and executing the plug-in.

7. The method of claim 6, wherein the DDF specifies a uniform resource locator (URL) address for the plug-in.

8. The method of claim 6, wherein step (d) comprises downloading the plug-in via a network.

9. The method of claim 8, wherein the network is the Internet.

10. The method of claim 1, wherein the DDF is in extensible markup language (XML) format.

11. The method of claim 1, wherein step (c) comprises checking if any one or more segments of the DDF need updating, and updating only the one or more segments needing updating.

12. The method of claim 11, wherein step (c) further comprises updating the one or more segments by downloading updated segments from a network.

13. A computer system comprising a processor and a memory, wherein:
the memory is adapted to store a diagnostic definitions file (DDF) adapted to be used by a diagnostic tool designed for use with a primary software application (PSA), the DDF comprising:
information specifying one or more diagnostic tests related to the PSA to be performed by the diagnostic tool, wherein each diagnostic test produces a result;
information specifying an expected result for each diagnostic test; and
specification of a failure action to be performed for each diagnostic test if the result produced by the diagnostic test is not equivalent to the expected result for the diagnostic test; and
the processor is adapted to launch the diagnostic tool, wherein the diagnostic tool is adapted to:
(i) determine whether the DDF needs to be updated;
(ii) update the DDF, if the DDF needs to be updated;
(iii) perform one or more of the diagnostic tests specified in the DDF;
(iv) determine whether the result produced by each performed diagnostic test is equivalent to the expected result for the performed diagnostic test; and
(v) perform the failure action specified for each performed diagnostic test whose result is not equivalent to the expected result for the performed diagnostic test.

14. The system of claim 13, further comprising a display adapted to display for a user the result of each performed diagnostic test.

15. The system of claim 13, wherein the diagnostic tool is designed to operate with any updated DDF without having to update the diagnostic tool itself.

16. The system of claim 13, wherein:
the DDF specifies the location of a plug-in for at least one diagnostic test; and
the diagnostic tool is adapted to access and execute the plug-in.

17. The system of claim 16, wherein the diagnostic tool is adapted to download the plug-in via a network.

18. The system of claim 13, wherein the DDF is in extensible markup language (XML) format.

19. The system of claim 13, wherein the diagnostic tool is adapted to:
check if any one or more segments of the DDF need updating; and
update only the one or more segments needing updating.

20. A machine-readable medium, having encoded thereon program code, wherein, when the program code is executed by a machine, the machine implements a method comprising:
(a) launching a diagnostic tool designed for use with a primary software application (PSA);
(b) determining, by the diagnostic tool, whether a diagnostic definitions file (DDF) for use by the diagnostic tool needs to be updated, wherein the DDF comprises:
information specifying one or more diagnostic tests related to the PSA to be performed by the diagnostic tool, wherein each diagnostic test produces a result;
information specifying an expected result for each diagnostic test; and
specification of a failure action to be performed for each diagnostic test, if the result produced by the diagnostic test is not equivalent to the expected result for the diagnostic test;
(c) updating the DDF, if the DDF needs to be updated;
(d) performing, by the diagnostic tool, one or more of the diagnostic tests specified in the DDF;
(e) determining, by the diagnostic tool, whether the result produced by each performed diagnostic test is equivalent to the expected result for the performed diagnostic test; and
(f) performing the failure action specified for each performed diagnostic test whose result is not equivalent to the expected result for the performed diagnostic test.

* * * * *